United States Patent
Lim et al.

(10) Patent No.: US 7,256,557 B2
(45) Date of Patent: Aug. 14, 2007

(54) SYSTEM AND METHOD FOR PRODUCING WHITE LIGHT USING A COMBINATION OF PHOSPHOR-CONVERTED WHITE LEDS AND NON-PHOSPHOR-CONVERTED COLOR LEDS

(75) Inventors: Kevin Len Li Lim, Perak (MY); Joon Chok Lee, Sarawak (MY); Kee Yean Ng, Penang (MY)

(73) Assignee: Avago Technologies General IP(Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/273,122

(22) Filed: Nov. 14, 2005

(65) Prior Publication Data

US 2006/0066266 A1 Mar. 30, 2006

Related U.S. Application Data

(63) Continuation-in-part of application No. 10/798,010, filed on Mar. 11, 2004, now Pat. No. 7,009,343.

(51) Int. Cl.
*H01J 1/60* (2006.01)
(52) U.S. Cl. ...................................... 315/312
(58) Field of Classification Search ................ 315/149, 315/224, 291, 312; 362/234, 253, 800
See application file for complete search history.

(56) References Cited

U.S. PATENT DOCUMENTS

| | | | |
|---|---|---|---|
| 5,724,062 A | 3/1998 | Hunter | |
| 6,265,833 B1 | 7/2001 | Kim et al. | |
| 6,441,046 B1 | 8/2002 | Mendel et al. | |
| 6,507,159 B2 | 1/2003 | Muthu | |
| 6,576,881 B2 | 6/2003 | Muthu et al. | |
| 6,637,905 B1 | 10/2003 | Ng et al. | |
| 6,682,331 B1 | 1/2004 | Peh et al. | |
| 6,753,661 B2 * | 6/2004 | Muthu et al. | 315/307 |
| 6,888,633 B2 * | 5/2005 | Vander Jagt et al. | 356/407 |
| 7,009,343 B2 * | 3/2006 | Lim et al. | 315/150 |
| 2001/0033488 A1 | 10/2001 | Chliwnyj et al. | |
| 2002/0047624 A1 | 4/2002 | Stam et al. | |
| 2003/0076056 A1 | 4/2003 | Schuumans | |
| 2003/0100837 A1 | 5/2003 | Lys et al. | |
| 2003/0214242 A1 | 11/2003 | Berg-johansen | |
| 2003/0230991 A1 | 12/2003 | Muthu et al. | |
| 2004/0061814 A1 * | 4/2004 | Kim et al. | 349/65 |
| 2004/0105264 A1 * | 6/2004 | Spero | 362/276 |
| 2004/0145895 A1 * | 7/2004 | Ouderkirk et al. | 362/260 |
| 2004/0195975 A1 | 10/2004 | Fregoso | |

* cited by examiner

Primary Examiner—Shih-Chao Chen
Assistant Examiner—Minh Dieu A

(57) ABSTRACT

A system and method for generating white light involves using a combination of phosphor-converted white LEDs and non-phosphor-converted color LEDs to produce white light and adjusting the emitted light in response to feedback signals. Generating white light using a combination of phosphor-converted white LEDs and non-phosphor-converted color LEDs produces white light with an improved CRI and a wide SPD. Adjusting the emitted light in response to feedback allows luminance and chrominance characteristics of the white light to be controlled as the performance of the LEDs changes over time. The emitted light can be adjusted on a per-color basis and/or on a per-group basis, where a group of LEDs includes a combination of at least one phosphor-converted white LED and at least one non-phosphor-converted color LED.

23 Claims, 7 Drawing Sheets

SYSTEM AND METHOD FOR PRODUCING WHITE LIGHT USING A COMBINATION OF PHOSPHOR-CONVERTED WHITE LEDS AND NON-PHOSPHOR-CONVERTED COLOR LEDS

CROSS-REFERENCE TO RELATED APPLICATIONS

This application is a continuation-in-part (CIP) of application Ser. No. 10/798,010, filed Mar. 11, 2004 now U.S. Pat. No. 7,009,343, entitled "System and Method for Producing White Light Using LEDs," for which priority is claimed. The entire prior application is incorporated herein by reference.

BACKGROUND OF THE INVENTION

Light emitting diodes (LEDs) are typically monochromatic semiconductor light sources, and are currently available in various colors from UV-blue to green, yellow and red. Many lighting applications such as backlighting for liquid crystal display (LCD) panels require white light sources. Two common approaches for producing white light using monochromatic LEDs include (1) packaging individual red, green, and blue LEDs together and combining the light that is emitted from these LEDs to produce white light and (2) introducing fluorescent material into a UV, blue, or green LED so that some of the original light emitted by the semiconductor die of the LED is converted into longer wavelength light and combining the longer wavelength light with the original UV, blue, or green light to produce white light. LEDs produced using the second approach often use phosphor-based fluorescent material and are referred to as phosphor-converted white LEDs.

White light produced by a combination of red, green, and blue LEDs has a wide color gamut but generally has a poor Color Rendering Index (CRI). Although the color gamut of this type of white light source is wide, the light source requires more complex driving circuitry than a phosphor-converted white LED because the red, green, and blue LEDs include semiconductor dies that have different operating voltage requirements. In addition to having different operating voltage requirements, the red, green, and blue LEDs degrade differently over their operating lifetime, which can make color control over an extended period difficult.

Phosphor-converted white LEDs require only a single type of monochromatic LED to produce white light and all of the white LEDs of a multi-LED light source can be driven at the same operating voltage. One shortcoming of phosphor-converted white LEDs is that their spectral power distribution (SPD) is not uniform. This shortcoming results in a relatively poor Color Rendering Index (CRI). In addition, the color generated by phosphor-converted white LEDs tends to vary from its original value over the operating life and with changes in conditions.

What is needed is a white light source that has a high CRI and a wide color gamut that can produce consistent white light over time.

SUMMARY OF THE INVENTION

A system and method for generating white light involves using a combination of phosphor-converted white LEDs and non-phosphor-converted color LEDs to produce white light and adjusting the emitted light in response to feedback signals. Generating white light using a combination of phosphor-converted white LEDs and non-phosphor-converted color LEDs produces white light with an improved CRI and a wide SPD. Adjusting the emitted light in response to feedback allows luminance and chrominance characteristics of the white light to be controlled as the performance of the LEDs changes over time. The emitted light can be adjusted on a per-color basis and/or on a per-group basis, where a group of LEDs includes a combination of at least one phosphor-converted white LED and at least one non-phosphor-converted color LED.

A light system in accordance with the invention has a light source that includes at least one phosphor-converted white LED, at least one non-phosphor-converted color LED, and a spectral feedback control system configured to detect light that is output from the light source and to adjust the light that is output from the light source in response to the light detection. The spectral feedback control system may include a color sensor configured to provide color-specific feedback signals, a controller configured to generate control signals in response to the color-specific feedback signals, and a driver configured to generate drive signals in response to the control signals.

A method for operating a light system in accordance with the invention involves providing drive signals to a light source that includes at least one phosphor-converted white LED and at least one non-phosphor-converted color LED, detecting light that is generated in response to the drive signals, generating feedback signals in response to the detected light, and adjusting the drive signals that are provided to the light source in response to the feedback signals. Color-specific feedback signals can be generated from the detected light. The color-specific feedback signals are used to adjust the drive signals for the LEDs on a per-color and/or per-group basis to maintain luminance and chrominance characteristics of the detected light.

Other aspects and advantages of the present invention will become apparent from the following detailed description, taken in conjunction with the accompanying drawings, illustrated by way of example of the principles of the invention.

DETAILED DESCRIPTION

Figure 1:
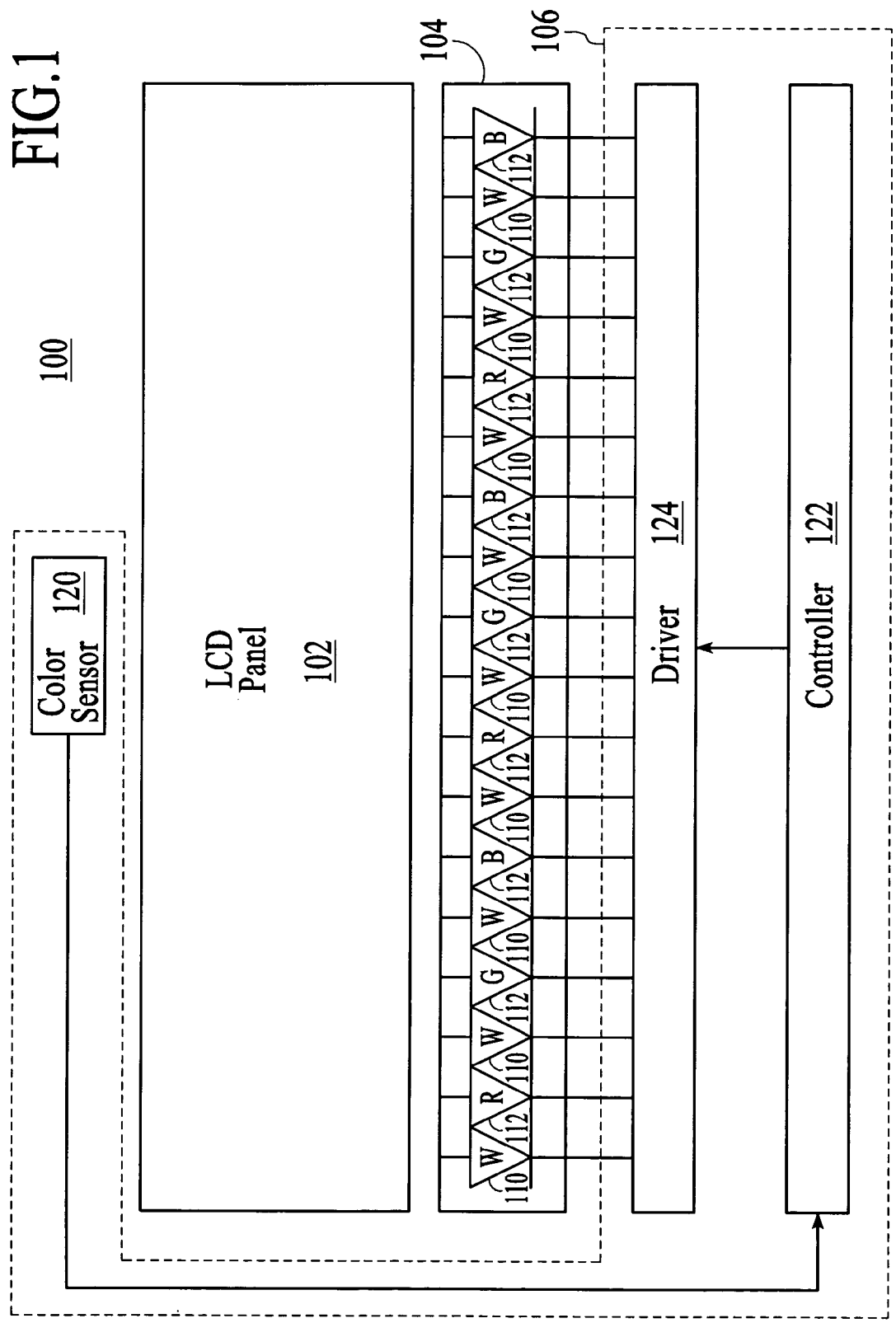
FIG. 1 depicts a light system that is used to backlight a liquid crystal display (LCD) panel in accordance with the invention.

FIG. 1 depicts a light system 100 that is used to backlight a liquid crystal display (LCD) panel. The light system includes an LCD panel 102, a light source 104, and a spectral feedback control system 106. LCD panels are well known in the field of LCD displays and although an LCD panel is described, other optical media that allows the transmission of light may be used with the light system.

The light source 104 is configured to generate white light in response to applied drive signals. The light source is oriented with respect to the LCD panel 102 such that light is incident on a side surface of the LCD panel as is known in the field of LCDs. Backlighting of LCD panels in general is well known in the field and is not described further herein. The light source depicted in FIG. 1 is made up of multiple light emitting diodes (LEDs), including a mix of LEDs 110 that emit white light or off-white light and LEDs 112 that emit monochromatic light of a particular color. In the embodiment of FIG. 1, the LEDs that emit white light or off-white light are phosphor-converted LEDs and are referred to herein as "phosphor-converted white LEDs." Phosphor-converted white LEDs are well known in the field of LEDs. In one example, phosphor-converted white LEDs combine an LED that emits a blue light with a phosphor such as Cerium activated Yitrium Aluminium Garnet ($Y_3Al_5O_{12}$:$Ce^{3+}$). The blue LED emits a first radiation typically with a peak wavelength of 460 to 480 nanometers (nm). The phosphor partially absorbs the blue radiation and re-emits a second broadband radiation with a peak wavelength of 560 to 580 nm. The combination of the first and second radiations gives off white light. As used herein, "white light" is defined as light having a color point that lies close to the blackbody curve of the CIE Chromaticity Diagram and "off-white light" is defined as light having a color point that lies further away from the blackbody curve than the color point of the white light. Further, white light is light that is suitable for backlighting an LCD while off-white light must be used in combination with another color LED to produce white light suitable for backlighting an LCD. For example, a phosphor-converted white LED that emits bluish-white light can be used in combination with a non-phosphor-converted red and green LEDs to produce white light suitable for backlighting an LED.

Figure 2:
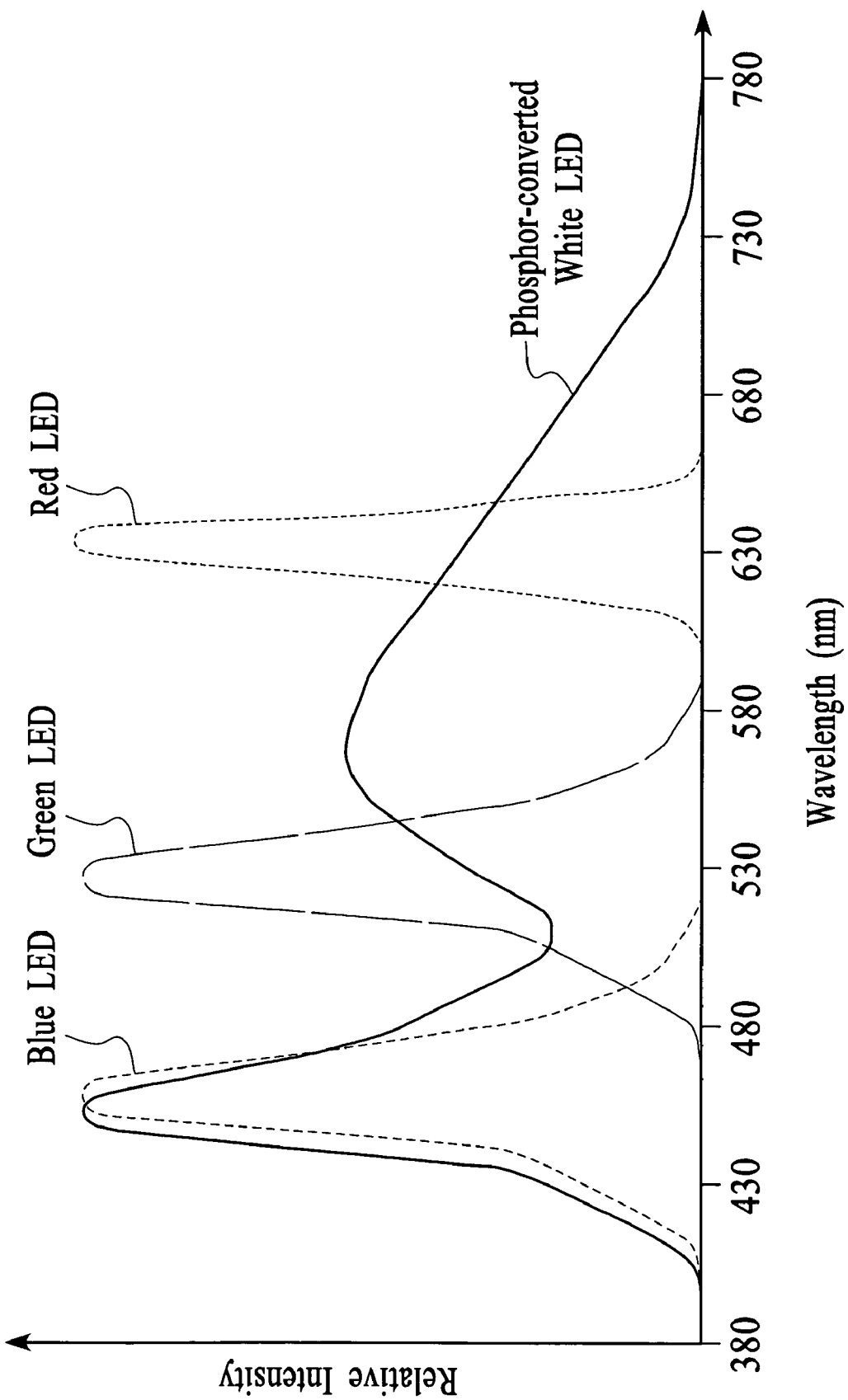
FIG. 2 depicts a graph of the spectral power distribution of a phosphor-converted white LED versus the spectral power distribution of red, green, and blue LEDs.

The LEDs 112 that emit monochromatic light of a particular color do not utilize phosphor-conversion and are referred to herein as "non-phosphor-converted color LEDs." In the embodiment of FIG. 1, the non-phosphor-converted color LEDs include a mix of red (R), green (G), and blue (B) LEDs that emit monochromatic colored light in the respective red, green, and blue spectrums. Non-phosphor-converted color LEDs are well known in the field of LEDs. Although the non-phosphor-converted color LEDs in the example embodiment of FIG. 1 are red, green, and blue, other non-phosphor-converted color LED combinations can be used. For example, color mixes that include cyan and amber LEDs can be used instead of, or in addition to, red, green, and blue LEDs. The phosphor-converted white LEDs 110 are used in the light source because they are a relatively efficient source of white or off-white light. However, phosphor-converted white LEDs have an SPD that is biased towards shorter wavelengths which results in a relatively poor CRI. The red, green, and blue LEDs are added to the light source to both (1) improve the CRI of the white light that is emitted from the light source and (2) to control and maintain the white light. FIG. 2 depicts a graph of the spectral power distribution of a phosphor-converted white LED versus the spectral power distribution of red, green and blue LEDs.

The phosphor-converted white LEDs 110 and non-phosphor-converted color LEDs 112 are typically placed along an edge of the LCD panel 102. As depicted in FIG. 1, the phosphor-converted white LEDs and non-phosphor-converted color LEDs are distributed in a repeating pattern of white, red, white, green, white, and blue (W R W G W B as shown in FIG. 1). Although a specific pattern of LED distribution is depicted in FIG. 1, other patterns and/or distributions of LEDs can be used. The details of the patterns and/or distributions of LEDs are specific to the application.

Although there is a mix of phosphor-converted white LEDs 110 and non-phosphor-converted color LEDs 112 in the light source 104 depicted in FIG. 1, the light source is predominantly made up of phosphor-converted white LEDs. The distribution of LEDs throughout the light source in FIG. 1 is one phosphor-converted white LED for every one red, green, or blue LED. In another example, a backlight system for a mid-sized LCD panel (e.g., several inches diagonally) may include a distribution of ten phosphor-converted white LEDs, two red LEDs, four green LEDs, and two blue LEDs.

Returning to FIG. 1, the spectral feedback control system 106 includes a color sensor 120, a controller 122, and a driver 124. The color sensor is oriented with respect to the LCD panel 102 and the light source 104 to detect light that passes through the LCD panel after being emitted from the light source. In the embodiment of FIG. 1, the color sensor is a tri-color sensor that generates color-specific feedback signals that represent color-specific luminance and chrominance characteristics of the detected light. For example, the color sensor provides a set of electrical signals that can be used to represent tristimulus information related to the detected light.

The controller 122 controls the driving of the LEDs 110 and 112 that make up the light source 104. The controller receives color-specific feedback signals from the color sensor 120 and generates control signals in response to the color-specific feedback signals. The control signals are generated to produce a desired color from the light source. In an embodiment, the control signals are color-specific control signals that are used to control the LEDs on a per-color basis.

Figure 3:
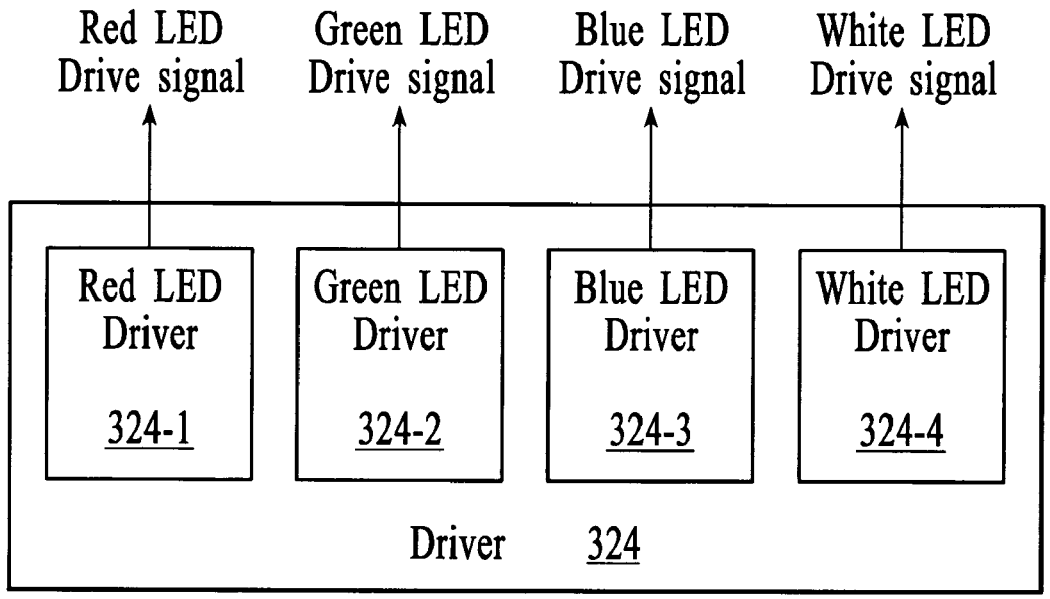
FIG. 3 is an expanded view of the driver from FIG. 1 showing drivers that are specific to the white, red, green, and blue LEDs.

The driver 124 translates the control signals received from the controller into drive signals that drive the light source 104. For example, the driver produces color-specific drive signals that control the LEDs 110 and 112 on a per-color basis. That is, the driver can control the white LEDs and each set of color LEDs (e.g., red, green, and blue) separately. The drive signals generated by the driver may involve voltage and/or current changes being applied to the LEDs. Alternatively, time modulation can be used to control the intensity of the light that is emitted from the LEDs. FIG. 3 depicts an expanded view of the driver from FIG. 1. The driver 324 depicted in FIG. 3 includes color-specific drivers 324-1, 324-1, and 324-3 for the red, green, and blue LEDs, respectively, as well as white LED driver 324-4. The color-specific drivers enable the driver to control the color LEDs on a per-color basis.

In operation, the spectral feedback control system 106 of FIG. 1 measures luminance and chrominance characteristics of the light that is output from the light source 104 and then adjusts the output light in response to the measurements. Operation of the system is described in detail with reference to FIG. 1. Starting at the driver 124 for description purposes, the driver provides drive signals to drive the LEDs 110 and 112. For example, the driver produces drive signals that are specific to the phosphor-converted white LEDs and color-specific drive signals that are specific to the red, green, and blue LEDs. The LEDs of the light source generate light in response to the drive signals and the light travels through the LCD panel 102. The color sensor 120 detects the light that passes through the LCD panel and generates feedback signals in response to the detection. In the embodiment of FIG. 1, the color sensor outputs color-specific feedback signals related to the red, green, and blue spectrums. The color-specific feedback signals from the color sensor are received by the controller 122 and used to adjust the light source drive signals to produce white light with the desired luminance and chrominance characteristics. To achieve white light with the desired luminance and chrominance characteristics, the controller generates color-specific control signals in response to the color-specific feedback signals from the color sensor. In one embodiment, color-specific control signals are generated by comparing the color-specific feedback signals from the color sensor with reference color information. For example, the color-specific control signals are generated as a function of the difference between the color-specific feedback signals from the color sensor and the reference color information. Example techniques for generating color-specific control signals are described in more detail below.

The color-specific control signals that are generated by the controller 122 are provided to the driver 124. The driver translates the color-specific control signals into color-specific drive signals. The color-specific drive signals are then applied to the color LEDs 112 of the light source 104. In an embodiment, the driver adjusts the drive signals on a per-color basis to produce white light with the desired luminance and chrominance characteristics.

The process of providing drive signals, detecting the resulting light, generating feedback signals, and adjusting the drives signals in response to the feedback signals is a continuous process. Because of the feedback nature of the process, adjustments in the drive signals can be continually made on a per-color basis to maintain the desired luminance and chrominance characteristics of the white light even though the light emitted from the light source 104 may drift. For example, the red, green, and blue LEDs 112 can be adjusted on a per-color basis to provide white light with the desired luminance and chrominance characteristics. In an embodiment, providing the desired white light involves maintaining the desired white light as the light emitted by the individual color LEDs of the light source drifts.

For the purposes of example, the system 100 depicted in FIG. 1 is a three color ("trichromatic") RGB based system. The colored light of a trichromatic system may be described in terms of tristimulus values, based on matching the three colors such that the colors typically cannot be perceived individually. Tristimulus values represent the intensity of three matching lights, in a given trichromatic system, required to match a desired shade. Tristimulus values can be calculated using the following equations:

$$X = k \sum_\lambda W\bar{x}_\lambda R_\lambda$$

$$Y = k \sum_\lambda W\bar{y}_\lambda R_\lambda$$

$$Z = k \sum_\lambda W\bar{z}_\lambda R_\lambda$$

where $$W\bar{x}_\lambda = P_\lambda \bar{x}_\lambda$$

$$W\bar{y}_\lambda = P_\lambda \bar{y}_\lambda$$

$$W\bar{z}_\lambda = P_\lambda \bar{z}_\lambda$$

$$k = 100 / \sum W\bar{y}_\lambda$$

The relative spectral power distribution, $P_\lambda$, is the spectral power per constant-interval wavelength throughout the spectrum relative to a fixed reference value. The CIE color matching functions, $\bar{x}_\lambda$, $\bar{y}_\lambda$, and $\bar{z}_\lambda$, are the functions $\bar{x}(\lambda)$, $\bar{y}(\lambda)$, and $\bar{z}(\lambda)$ in the CIE 1931 standard colorimetric system or the functions $\bar{x}_{10}(\lambda)$, $\bar{y}_{10}(\lambda)$, and $\bar{z}_{10}(\lambda)$ in the CIE 1964 supplementary standard colorimetric system. The CIE 1931 standard colorimetric observer is an ideal observer whose color matching properties correspond to the CIE color matching functions between 1° and 4° fields, and the CIE 1964 standard colorimetric observer is an ideal observer whose color matching properties correspond to the CIE color matching functions for field sizes larger than 4°. The reflectance, $R_\lambda$, is the ratio of the radiant flux reflected in a given cone, whose apex is on the surface considered, to that reflected in the same direction by the perfect reflecting diffuser being irradiated. Radiant flux is power emitted, transferred, or received in the form of radiation. The unit of radiant flux is the watt (W). A perfect reflecting diffuser is an ideal isotropic diffuser with a reflectance (or transmittance) equal to unity. The weighting functions, $W\bar{x}_\lambda$, $W\bar{y}_\lambda$, and $W\bar{z}_\lambda$, are the products of relative spectral power distribution, $P_\lambda$, and a particular set of CIE color matching functions, $\bar{x}_\lambda$, $\bar{y}_\lambda$, and $\bar{z}_\lambda$.

Figure 4A:
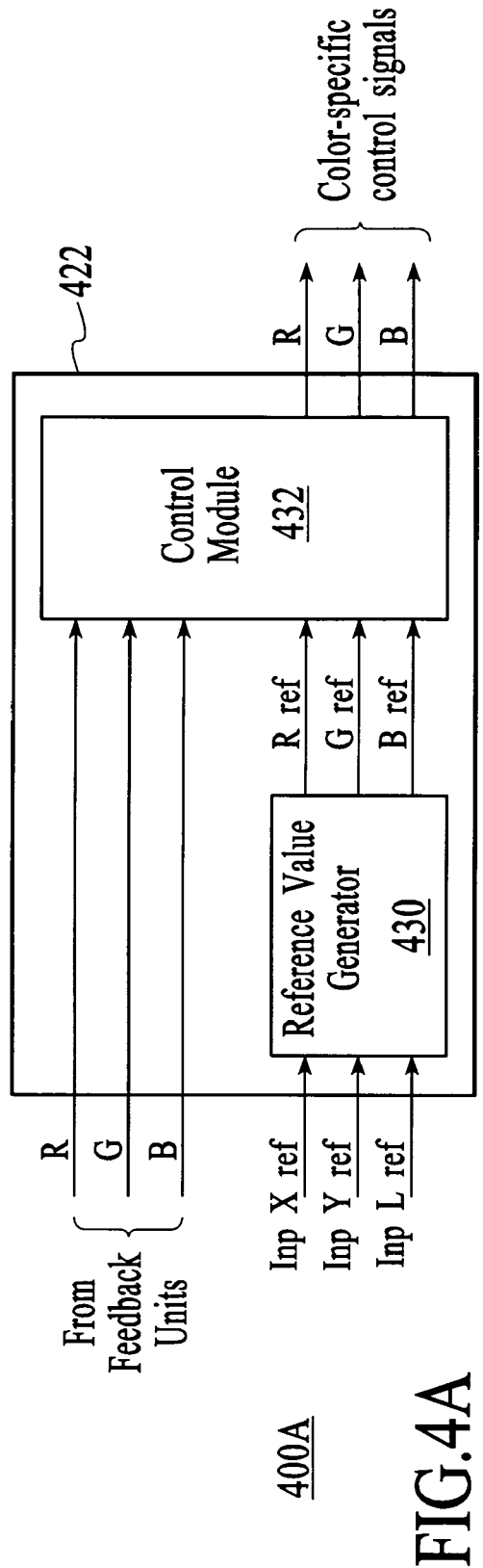
FIG. 4A is an expanded view of the controller from FIG. 1.
Figure 4B:
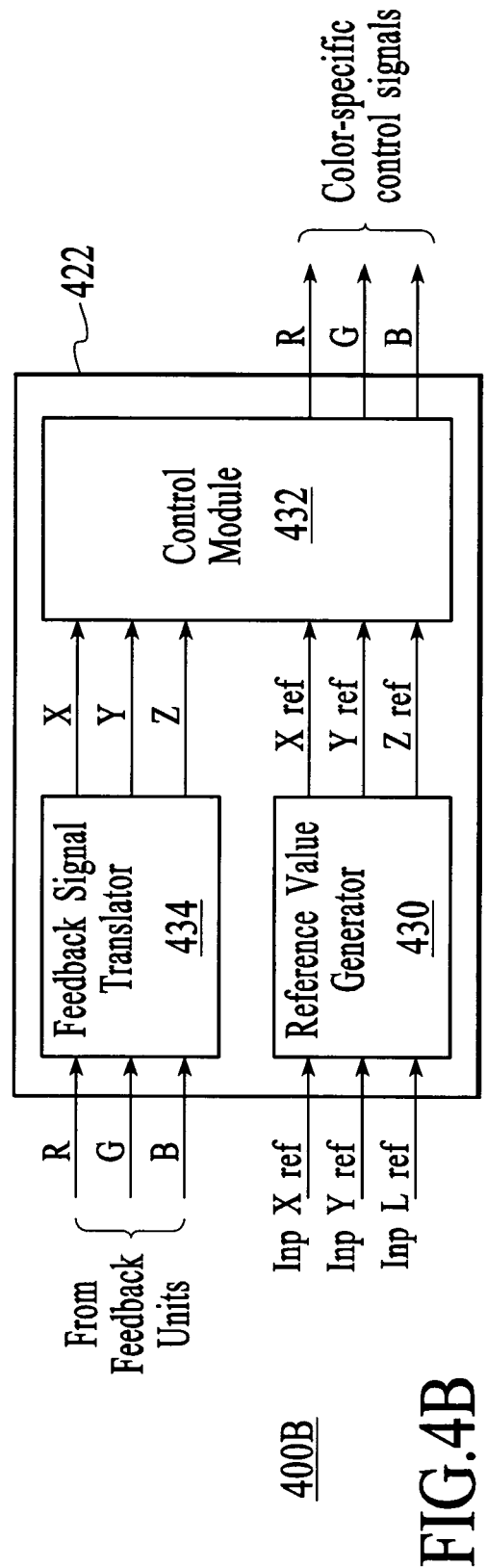
FIG. 4B is an expanded view of another embodiment of the controller from FIG. 1 that uses CIE 1931 tristimulus values.

The controller 122 depicted in FIG. 1 can be implemented in many different ways to achieve color-specific control. FIGS. 4A and 4B depict examples of controllers 422 that can be used to adjust the red, green, and blue LEDs on a per-color basis in the light source depicted in FIG. 1. With reference to FIG. 4A, the controller 422 includes a reference value generator 430 and a control module 432. The controller receives color-specific feedback signals in the form of measured tristimulus values in RGB space (R, G, and B) from the color sensor 120 (FIG. 1). The controller also receives input reference tristimulus values. The input reference tristimulus values may be in the form of a target white color point (X ref and Y ref) and lumen value (L ref). A user may enter the input reference tristimulus values through a user interface (not shown) or the input reference tristimulus values could be received in some other manner. The reference value generator translates the input reference tristimulus values to reference tristimulus values in RGB space (R ref, G ref, and B ref). The control module then determines the difference between the measured tristimulus values and reference tristimulus values and generates color-specific control signals that reflect adjustments that need to be made to the drive signals on a per-color basis to achieve the desired color. The color-specific control signals cause the color LEDs to be adjusted, as necessary, to emit light of the desired color. In this way, the luminance and chrominance characteristics of the light source approaches the desired (i.e., reference) luminance and chrominance characteristics.

The alternate system 400B of FIG. 4B is similar to the system 400A of FIG. 4A except that it uses CIE 1931 tristimulus values. The system 400B includes a feedback signal translator 434 that translates measured tristimulus values in RGB space to measured CIE 1931 tristimulus values. Additionally, the reference value generator 430 converts input reference tristimulus values to reference CIE 1931 tristimulus values. The control module 432 then determines the difference between the measured CIE 1931 tristimulus values and the reference CIE 1931 tristimulus values and adjusts the color-specific control signals accordingly.

Figure 5:
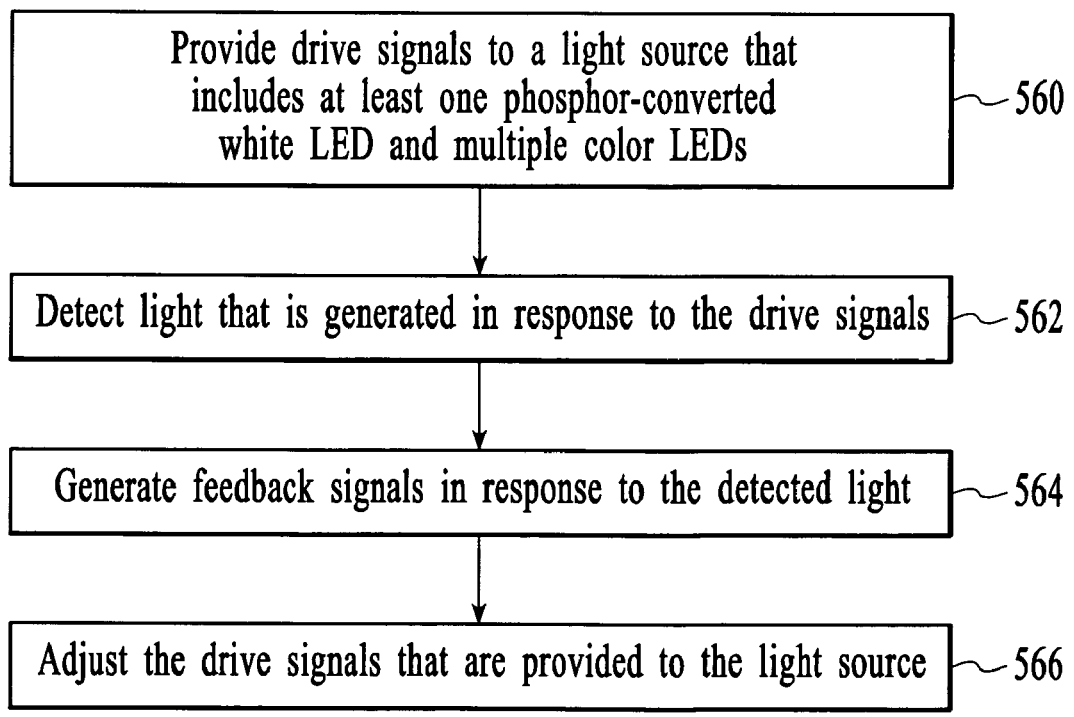
FIG. 5 depicts a process flow diagram of a method for operating a light system.

FIG. 5 depicts a process flow diagram of a method for operating a light system. At block 560, drive signals are provided to a light source that includes at least one phosphor-converted white LED and multiple color LEDs. At block 562, light that is generated in response to the drive signals is detected. At block 564, feedback signals are generated in response to the detected light. At block 566, the drive signals that are provided to the light source are adjusted.

Although the light system 100 is described as a backlight for an LCD panel, the light system can be used in any other light application and is in no way limited to backlighting for LCD panels.

Other embodiments of the spectral feedback control system 106 that provide feedback signals and adjust the color LEDs on a per-color basis in response to the feedback signals are possible.

Figure 6A:
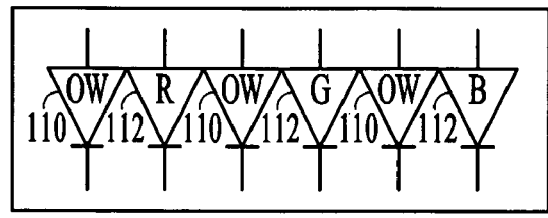
FIGS. 6A-6E depict examples of light sources with different combinations of phosphor-converted white LEDs and non-phosphor-converted color LEDs.
Figure 6B:
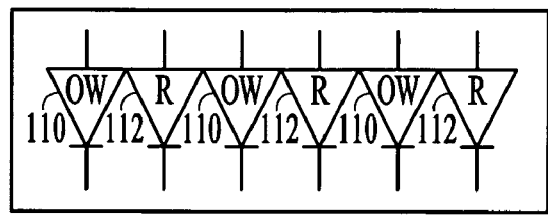
Figure 6C:
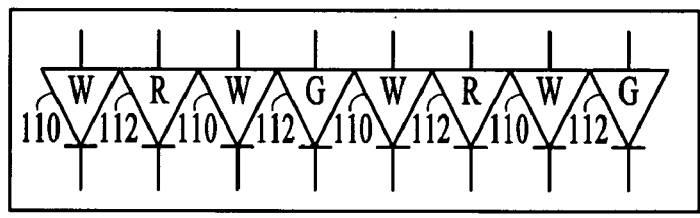
Figure 6D:
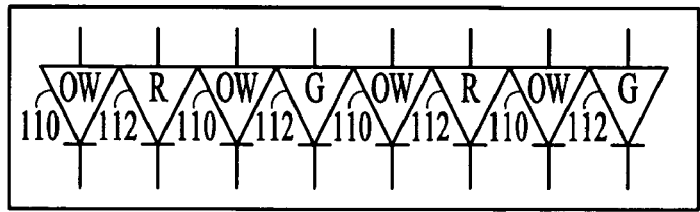
Figure 6E:
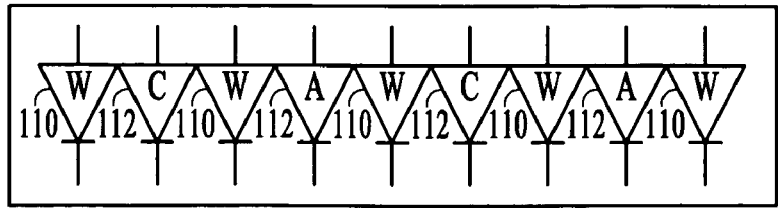

Although the light source 104 depicted in FIG. 1 includes a particular combination of phosphor-converted white LEDs and non-phosphor-converted color LEDs, other combinations are possible. Additional examples of light sources with different combinations of phosphor-converted white LEDs and non-phosphor-converted color LEDs are depicted in FIGS. 6A-6E. FIG. 6A depicts an embodiment of light source 104 that includes a combination of phosphor-converted white LEDs 110 that emit off-white (OW) light and non-phosphor-converted color LEDs 112 that emit red, green, and blue light, respectively. FIG. 6B depicts an embodiment of light source 104 that includes a combination of phosphor-converted white LEDs 110 that emit off-white light and non-phosphor-converted color LEDs 112 that emit red light. FIG. 6C depicts an embodiment of light source 104 that includes a combination of phosphor-converted white LEDs 110 that emit white light and non-phosphor-converted color LEDs 112 that emit red and green, respectively. FIG. 6D depicts an embodiment of light source 104 that includes a combination of phosphor-converted white LEDs 110 that emit off-white light and non-phosphor-converted color LEDs 112 that emit red and green, respectively. FIG. 6E depicts an embodiment of light source 104 that includes a combination of phosphor-converted white LEDs 110 that emit white light and non-phosphor-converted color LEDs 112 that emit cyan and amber light, respectively.

In the embodiment described with reference to FIGS. 1-4B, the control signals and drive signals are described as color-specific control signals and color-specific drive signals that control the LEDs on a per-color basis. In an alternative embodiment, control signals and drive signals can be generated on a group basis. That is, different combinations of phosphor-converted white LEDs and/or non-phosphor-converted color LEDs can be controlled together in groups. For example, in an embodiment that includes a light source 104 configured as in FIG. 1, the red LEDs can be controlled in combination with some or all of the white LEDs, the green LEDs can be controlled in combination with some or all of the white LEDs, and the blue LEDs can be controlled in combination with some or all of the white LEDs. The grouped LEDs are controlled with common control signals (e.g., a red+white control signal, a green+white control signal, and a blue+white control signal. A benefit of controlling LEDs on a group basis (e.g., with different combinations of phosphor-converted white LEDs and non-phosphor-converted color LEDs) is that the light system can be easily integrated into larger systems that are already configured for light systems with just red, green, and blue LEDs. For example, in many applications, the same controller, color sensor, driver, and circuit board can be used when the LEDs are controlled as described with reference to FIGS. 7A and 8A. In particular, a light system with a combination of phosphor-converted white LEDs and non-phosphor-converted red, green, and blue LEDs can be controlled as described with reference to FIGS. 1, 7A, and 8A using three control channels instead of four control channels.

Figure 7A:
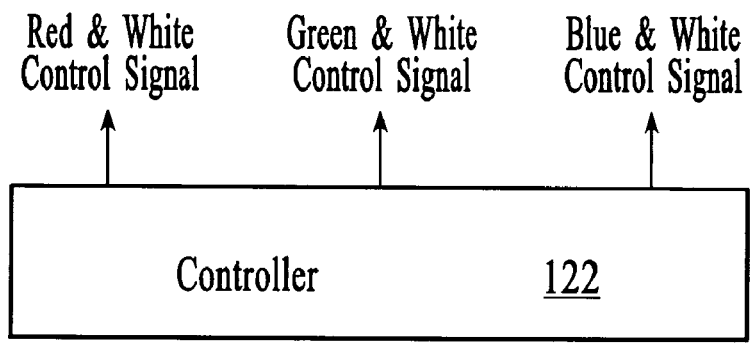
FIGS. 7A and 7B depict controllers that generate group-specific control signals.
Figure 7B:
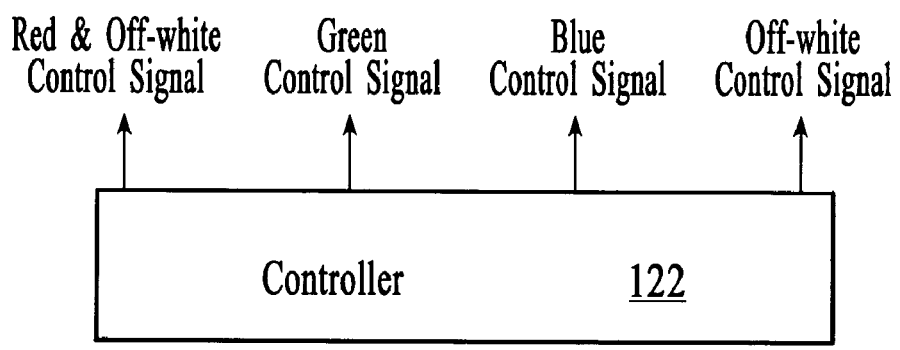

As described above, the controller 122 generates control signals in response to the color-specific feedback signals. In an alternative embodiment, the controller generates group-specific control signals that are used to control groups of LEDs that include a combination of different phosphor-converted white and/or non-phosphor-converted color LEDs. For example, FIG. 7A depicts a controller that generates group-specific control signals that include a red+white control signal for controlling the red LEDs and at least a portion of the white LEDs, a green+white control signal for controlling the green LEDs and at least a portion of the white LEDs, and a blue+white control signal for controlling the blue LEDs and at least a portion of the white LEDs. FIG. 7B depicts a controller that generates group-specific control signals that include a red+off-white control signal for controlling the red LEDs and at least a portion of the off-white LEDs, a green control signal for controlling the green LEDs, a blue control signal for controlling the blue LEDs, and an off-white control signal for controlling at least a portion of the off-white LEDs. Although two combinations of control signals that include at least one group-specific control signal are described with reference to FIGS. 7A and 7B, other example combinations are contemplated.

Figure 8A:
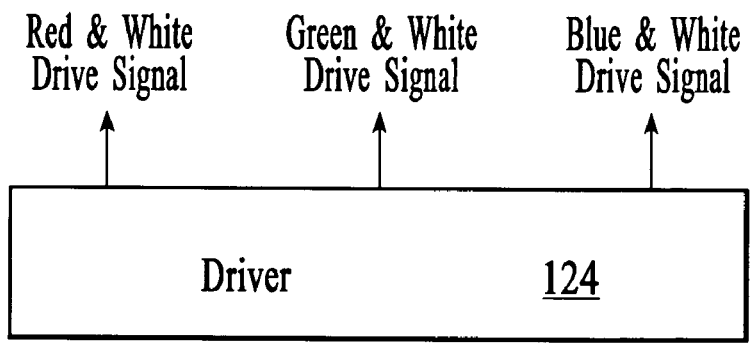
FIGS. 8A and 8B depict drivers that generate group-specific drive signals.
Figure 8B:
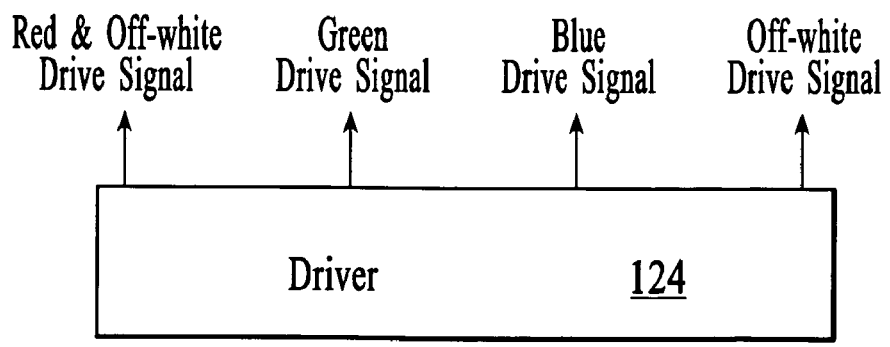

As described above, the driver 124 translates the control signals received from the controller 122 into drive signals that drive the light source 104. In an embodiment, the driver generates group-specific drive signals that are used to drive groups of LEDs that include a combination of phosphor-converted white and non-phosphor-converted color LEDs. For example, FIG. 8A depicts a driver that generates group-specific drive signals that include a red+white drive signal for driving the red LEDs and at least a portion of the white LEDs, a green+white drive signal for driving the green LEDs and at least a portion of the white LEDs, and a blue+white drive signal for driving the blue LEDs and at least a portion of the white LEDs. FIG. 7B depicts a driver that generates group-specific drive signals that include a red+off-white drive signal for driving the red LEDs and at least a portion of the off-white LEDs, a green drive signal for driving the green LEDs, a blue drive signal for driving the blue LEDs, and an off-white drive signal for driving the off-white LEDs. Although two combinations of drive signals that include at least one group-specific drive signal are described with reference to FIGS. 8A and 8B, other example combinations are contemplated.

Figure 9:
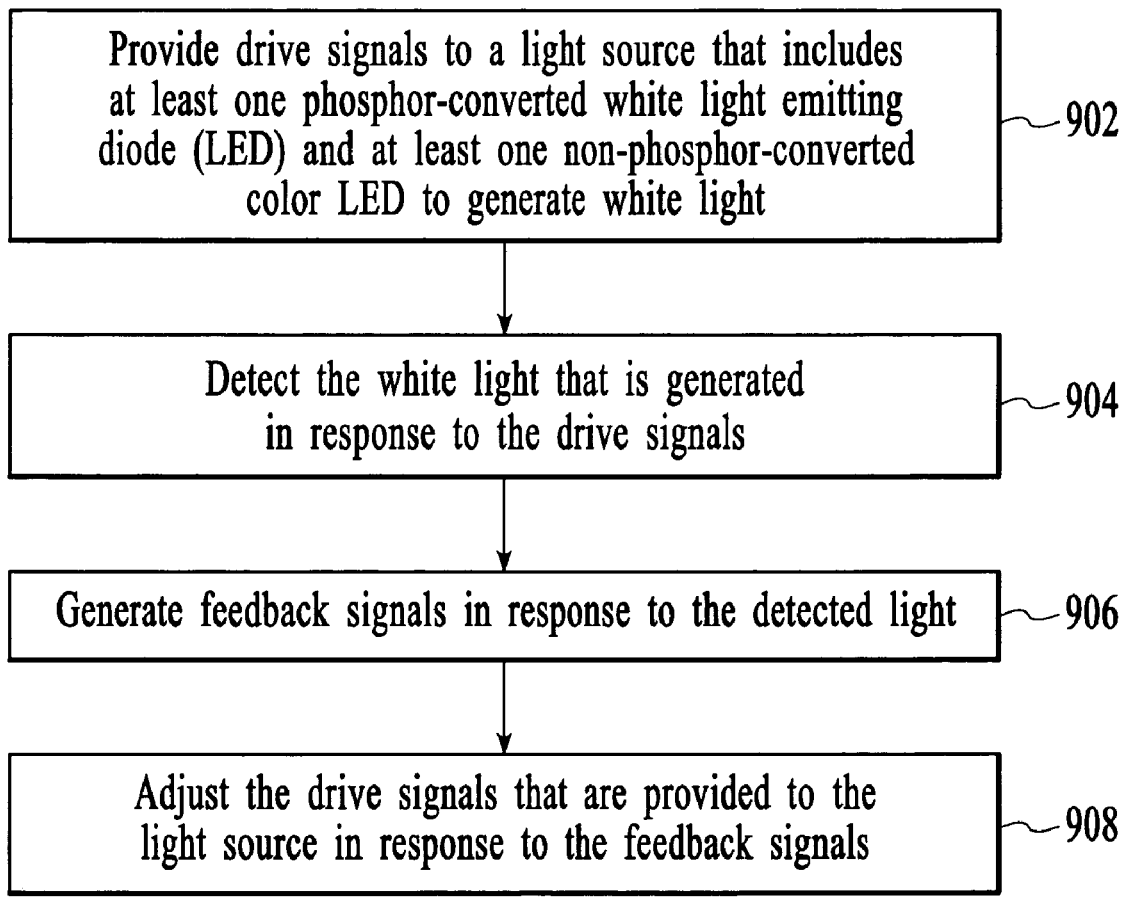
FIG. 9 depicts a process flow diagram of a method for operating a light system in accordance with the invention Throughout the description similar reference numbers may be used to identify similar elements.

FIG. 9 depicts a process flow diagram of a method for operating a light system in accordance with the invention. At block 902, drive signals are provided to a light source that includes at least one phosphor-converted white light emitting diode (LED) and at least one non-phosphor-converted color LED to generate white light. At block 904, the white light that is generated in response to the drive signals is detected. At block 906, feedback signals are generated in response to the detected light. At block 908, the drive signals that are provided to the light source are adjusted in response to the feedback signals.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A light system comprising:
   a light source that includes at least one phosphor-converted white light emitting diode (LED) and at least one non-phosphor-converted color LED; and
   a spectral feedback control system configured to drive the light source to output white light, to detect the white light that is output from the light source, and to adjust the white light that is output from the light source in response to the light detection.

2. The light system of claim 1 wherein the at least one phosphor-converted white LED comprises an LED that emits white or off-white light.

3. The light system of claim 2 wherein the at least one non-phosphor-converted color LED comprises an LED that emits one of red, green, blue, cyan, and amber light.

4. The light system of claim 1 wherein the spectral feedback control system further includes a color sensor configured to provide color-specific feedback signals for use in controlling the LEDs.

5. The light system of claim 1 wherein the spectral feedback control system further includes a color sensor configured to provide color-specific feedback signals for use in controlling the non-phosphor-converted color LEDs on a per-color basis.

6. The light system of claim 1 wherein the spectral feedback control system further includes a color sensor configured to provide color-specific feedback signals for use in controlling the LEDs on a per-group basis.

7. The light system of claim 6 wherein a group comprises a combination of at least one phosphor-converted white LED and at least one non-phosphor-converted color LED.

8. The light system of claim 1 wherein the spectral feedback control system includes a controller configured to control the LEDs on a per-color basis to maintain luminance and chrominance characteristics of the white light that is output from the light source.

9. The light system of claim 1 wherein the spectral feedback control system includes a controller configured to control the LEDs on a per-group basis to maintain luminance and chrominance characteristics of the white light that is output from the light source.

10. The light system of claim 9 wherein a group comprises a combination of at least one phosphor-converted white LED and at least one non-phosphor-converted color LED.

11. The light system of claim 1 wherein the spectral feedback control system includes:
   a color sensor configured to provide color-specific feedback signals;
   a controller configured to generate control signals in response to the color-specific feedback signals; and
   a driver configured to generate drive signals in response to the control signals.

12. The light system of claim 1 wherein the spectral feedback control system includes:
   a color sensor configured to provide color-specific feedback signals;
   a controller configured to generate color-specific control signals in response to the color-specific feedback signals; and
   a driver configured to generate color-specific drive signals in response to the color-specific control signals.

13. The light system of claim 1 wherein the spectral feedback control system includes:
   a color sensor configured to provide color-specific feedback signals;
   a controller configured to generate group-specific control signals in response to the color-specific feedback signals; and
   a driver configured to generate group-specific drive signals in response to the group-specific control signals;
   wherein a group comprises a combination of at least one phosphor-converted white LED and at least one non-phosphor-converted color LED.

14. A method for operating a light system comprising:
   providing drive signals to a light source that includes at least one phosphor-converted white light emitting diode (LED) and at least one non-phosphor-converted color LED to generate white light;
   detecting the white light that is generated in response to the drive signals;
   generating feedback signals in response to the detected light; and
   adjusting the drive signals that are provided to the light source in response to the feedback signals.

15. The method of claim 14 wherein generating feedback signals comprises generating color-specific feedback signals.

16. The method of claim 15 wherein adjusting the drive signals includes adjusting the drive signals for the color LEDs on a per-color basis in response to the color-specific feedback signals.

17. The method of claim 15 wherein adjusting the drive signals includes adjusting the drive signals for the LEDs on a per-group basis in response to the color-specific feedback signals.

18. The method of claim 14 wherein adjusting the drive signals includes adjusting the drive signals for the LEDs on a per-group basis in response to the color-specific feedback signals, wherein a group comprises a combination of at least one phosphor-converted LED and at least one non-phosphor-converted color LED.

19. A light system comprising:
   an LCD panel;
   a light source, in optical communication with the LCD panel, which includes at least one phosphor-converted white light emitting diode (LED) and at least one non-phosphor-converted color LED; and
   a spectral feedback control system configured to drive the light source to output white light, to detect the white light that is output from the light source, and to adjust the white light that is output from the light source in response to the light detection.

20. The light system of claim 19 wherein the at least one phosphor-converted LED comprises an LED that emits white or off-white light.

21. The light system of claim 20 wherein the at least one non-phosphor-converted color LED comprises an LED that emits one of red, green, blue, cyan, and amber light.

22. The light system of claim 21 wherein the spectral feedback control system is configured to control the color LEDs on a per-color basis.

23. The light system of claim 21 wherein the spectral feedback control system is configured to control the LEDs on a per-group basis, wherein a group comprises a combination of at least one phosphor-converted white LED and at least one non-phosphor-converted color LED.

* * * * *